US008371499B2

(12) United States Patent
Manuel-Devadoss (Johnson Smith)

(10) Patent No.: US 8,371,499 B2
(45) Date of Patent: Feb. 12, 2013

(54) METHOD AND APPARATUS TO PROVIDE THE DIGITAL CONTENT OF NON-FREE EVENT TO THE VIEWERS AND TO AUTHORIZE THE VIEWERS

(76) Inventor: Johnson Manuel-Devadoss (Johnson Smith), Chennai (IN)

( * ) Notice: Subject to any disclaimer, the term of this patent is extended or adjusted under 35 U.S.C. 154(b) by 561 days.

(21) Appl. No.: 12/646,245

(22) Filed: Dec. 23, 2009

(65) Prior Publication Data
US 2011/0147448 A1     Jun. 23, 2011

(51) Int. Cl.
    *G06F 17/00*     (2006.01)
    *G06K 7/00*     (2006.01)
    *G06K 19/00*     (2006.01)
    *G06K 9/00*     (2006.01)
    *H04H 60/33*     (2008.01)

(52) U.S. Cl. ............ 235/375; 235/435; 235/487; 725/9; 725/14; 725/15; 382/100; 348/61; 348/143

(58) Field of Classification Search .................. 235/375, 235/435, 487; 725/9–15; 382/100; 348/61; 348/143
See application file for complete search history.

(56) References Cited

U.S. PATENT DOCUMENTS

| 2005/0038749 | A1* | 2/2005 | Fitch et al. | ....................... 705/51 |
| 2006/0140374 | A1* | 6/2006 | Light et al. | ............... 379/201.01 |
| 2009/0030643 | A1* | 1/2009 | White et al. | ................... 702/127 |

* cited by examiner

*Primary Examiner* — Michael G Lee
*Assistant Examiner* — Laura Gudorf (57) ABSTRACT

Disclosed is a method and apparatus for providing the digital content of non-free event to viewers through interactive display electronic devices. The present invention includes a validator device that has unique Device Access Control address to interact with the entertainment system. Viewer's book ticket though the web interface component providing event details, preferred date/time to watch the event, location to watch event at home or theatre. For home viewing the Device Access Control (DAC) address is also submitted. Viewers receive email of ticket with 6-digit authentication code. At the time of the event the validator device authorizes the authentication code on ticket, validates count of viewers watching the event based on count of tickets purchased and if viewers are in right age to watch the event depending on rating of the event. Then the validator device downloads the digital content of event and streams to viewer's home display device from the theater/auditorium.

7 Claims, 14 Drawing Sheets

To: Jillu.Kutty@aol.com

CC:

Subject: AVATAR 2D – Movie at 08:00 AM

Dear Customer,
 Your movie – AVATAR 2D is starts in another 30 mins. Please be prepare for it.

Thank you for using ABC Entertainments Cinema

Legal Notices. Privacy Policy
Copyright © 2009 ABC Entertainments, Inc. All rights reserved.

Please do not reply to this message using the "reply" address. For assistance, please contact ABC Entertainments Cinema via telephone or via e-mail.

METHOD AND APPARATUS TO PROVIDE THE DIGITAL CONTENT OF NON-FREE EVENT TO THE VIEWERS AND TO AUTHORIZE THE VIEWERS

FIELD OF THE INVENTION

The present invention relates generally to the entertainment system, and more particularly, to providing digital content to viewers through interactive display electronic devices like television, personal computer and validating if the viewer is allowed to watch the digital content of the event.

BACKGROUND OF THE INVENTION

U.S. patent application Ser. No. 12/642,409, filed Dec. 18, 2009, entitled as "Method and system to provide live entertainment digital content to the home viewers", assigned to the same assignee as the instant application, which is herein incorporated by reference in its entirely.

In today's world significant importance is given to entertainment. People watch more movies and other forms of events like movies and non-free stage entertainment shows. Movies explore the edges of human emotion, freeze culture and show us how creative we can be. However most people do not preferred to watch the event in the theatre/auditorium due to a number of reasons. One of the top reasons being privacy—many prefer to avoid the crowd. They like to stay in the comfort of their home and watch entertainment thereby avoiding chatter disturbances from fellow members in the theater/auditorium.

Time constraint also plays as an important cause. Due to fixed event timings in theater/auditorium, people are not able to make it on-time. Sometimes the events of their choice are shown only once on a particular day, thereby forcing people to make adjustments in their daily schedule to watch the particular event.

Another reason that can be attributed to is climatic conditions. During rainy/snow season, many people miss out on a number of events, as they like to stay warm indoors. People try to avoid travelling to theatre/auditorium during the cold weather season. Due to this event revenue is affected and it causes great loss for the event producers and as well as the distributors who invest a huge sum of money for the making of each event.

Sometimes when a box-office movie is released, people may be busy with work or may have travelled out-of-country for a business meeting. If people miss out when the movie is released, they have to only wait for the CD/DVD of the movie to be released before they can watch their favorite movie.

Some live event shows occur only in bigger cities. Also only box-office movies are released in all the theatres, many small budget movies either are not shown in all theatres or they may be shown only for fewer days. This causes a lot of discomfort for people not living in major cities. They would really like to see the event but are unable to do so because they may have to travel long distances, in some cases make out-of-station travels to see a particular event.

Also, the present invention provides real-time parental guidance for the event. A motion picture rating system classifies the films with regard to suitability for audiences in terms of issues such as violence, substance abuse, profanity, impudence or other types of mature content. However, there is no guarantee to protect the kids from not watching digital content that is not suitable for them. So there is a need for real-time validation while watching entertainment at home.

Accordingly, there is a need for a system for to present the digital content of non-free event to people so that they can directly receive and enjoy the event from the comfort of their home. Also there is a need for a system that is secure, reliable and easy to use.

SUMMARY OF THE INVENTION

In view of the foregoing disadvantages inherent in the prior art, the general purpose of the present invention is to provide the non-free digital content to people at home for any event and to include all the advantages of the prior art, and also to overcome the drawbacks inherent therein.

The present invention takes event like movies and non-free stage entertainment shows to the comfort of viewers home. The viewer can privately enjoy the event like motion-picture show or non-free stage entertainment with his/her family members at home.

The present invention provides flexibility to the viewer to watch events like movies and non-free stage entertainment shows (i.e., concerts, magical shows) at his/her own convenient time in a day. The viewer chooses his/her own preferred date and time (e.g., anytime in 24 hours instead of predefined timings) at the time of ticket booking. This helps, as viewer no longer has to adjust the daily schedule to catch the event.

The present invention encourages people to watch newly released movies in all weather conditions. The viewer can book the required number of tickets online and can enjoy the event like movies and non-free stage entertainment live shows without even stepping out of their home. This aspect of the present invention greatly increases revenue for event producers and distributors. The present invention eliminates most of the traveling needed to watch entertainment.

Still another aspect of the present invention is providing real-time parental guidance for the audiences by validating if only right viewers are present for watching the entertainment by scanning the viewers and comparing with event rating present in the purchased ticket.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

FIG. 1.a illustrating a method for streaming the non-free digital content of event from theater/auditorium to Television with validator apparatus in accordance with an embodiment of the present invention;

FIG. 1.b illustrating a method for streaming the digital content of event from theater/auditorium to personal computer in accordance with an embodiment of the present invention;

FIG. 1.c.1 illustrating a method of extending the streaming non-free digital content of event of theater/auditorium from personal computer to external interactive display device i.e., Television in accordance with an embodiment of the present invention;

FIG. 1.c.2 illustrating a method of extending the streaming non-free digital content of event of theater/auditorium from mobile devices to external interactive display device i.e., Television in accordance with an embodiment of the present invention;

FIG. 1.d.1 illustrating an electronic ticket sent from the present invention to viewer's email address after the ticket booking.

FIG. 1.d.2 illustrating a reminder notification sent from the present invention to viewer's cell phone (i.e., SMS) and email address (e-mail message) before the event starts.

FIG. 2.a is block diagram of an event booking system (i.e., entertainment system) of theater/auditorium of present invention.

FIG. 2.b is a block diagram generally illustrating an exemplary validator apparatus architecture in which embodiments of the present invention.

FIG. 5.a is illustrating a method for prompting the access code to validate the credentials of the viewer in accordance with an embodiment of the present invention.

FIG. 5.b is illustrating a method for validating a viewer is in right age to watch the event in accordance with an embodiment of the present invention.

DETAILED DESCRIPTION OF THE INVENTION

The exemplary embodiments described herein detail for illustrative purposes and are subject to many variations in structure and design. It should be emphasized, however, that the present invention is not limited to a particular method to watch non-free digital event content from theatre/auditorium, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a" and "an" herein do not denote a limitation of quantity, but rather denote the presence of at least one of the referenced item.

The present invention discloses a method, system and apparatus for providing the digital content of non-free event like newly released movie, stage entertainment to viewer through interactive display electronic devices like television, personal computer, mobile devices like iPhone, BlackBerry, Windows Mobile. Also, the present invention discloses an apparatus to authorize the viewers and communicate with the entertainment system. Thereby, present invention allows viewers to relax and enjoy the newly released movie, non-free stage entertainments at their home in privacy. Thereby, the present invention increases the revenue for producer and distributors who invest huge money on events by providing round the clock event presentation as now more people can start to enjoy events.

Figure 1:
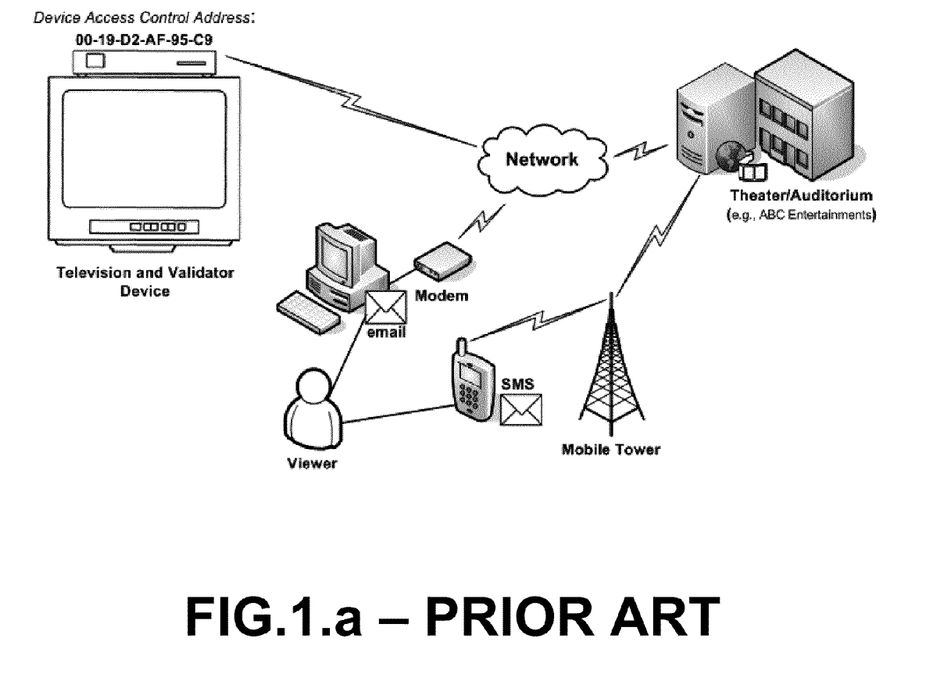

FIG. 1.a illustrates the first embodiment of the present invention showing digital content of non-free entertainment like newly released movie, stage entertainment to viewer through Television. Such an electronic device connected with validator apparatus and used as an interactive display device for streaming digital content of non-free event. A validator apparatus of the present invention is connected with Television to communicate to the entertainment system of theater/auditorium and authorizes the viewers to make sure the viewer count is correct for the purchased ticket and validate the viewer is in right age to watch the event. Each validator apparatus of the present invention is uniquely identified by Device Access Control address.

The present invention discloses a Device Access Control (DAC) address, which is a unique identifier, assigned to validator for identification, and used in the Device Access Control (DAC) protocol sub-layer. The Device Access Control (DAC) address is based on Media Access Control-48. The standard (IEEE 802) format for printing DAC-48 addresses in human-friendly form is six groups of two hexadecimal digits, separated by hyphens (-), in transmission order, e.g. 00-1F-29-01-57-70. The Device Access Control (DAC) address uniquely identifies each validator apparatus and allows communication with the entertainment system of theater/auditorium presented in the ticket. The first three octets identify the organization (i.e., theater/auditorium) that issued the identifier. The next three (MAC-48 and EUI-48) or five (EUI-64) octets are assigned by that organization (i.e., theater/auditorium) in nearly any manner they please, subject to the constraint of uniqueness. The present invention uses the Device Access Control (DAC) address to generate the authentication code for validation.

FIG. 1.b illustrates the second embodiment of the present invention that is streaming digital content of non-free event to personal computer and the personal computer is closely connected to validator apparatus to enable communications with the entertainment system of theater/auditorium.

Figure 2:
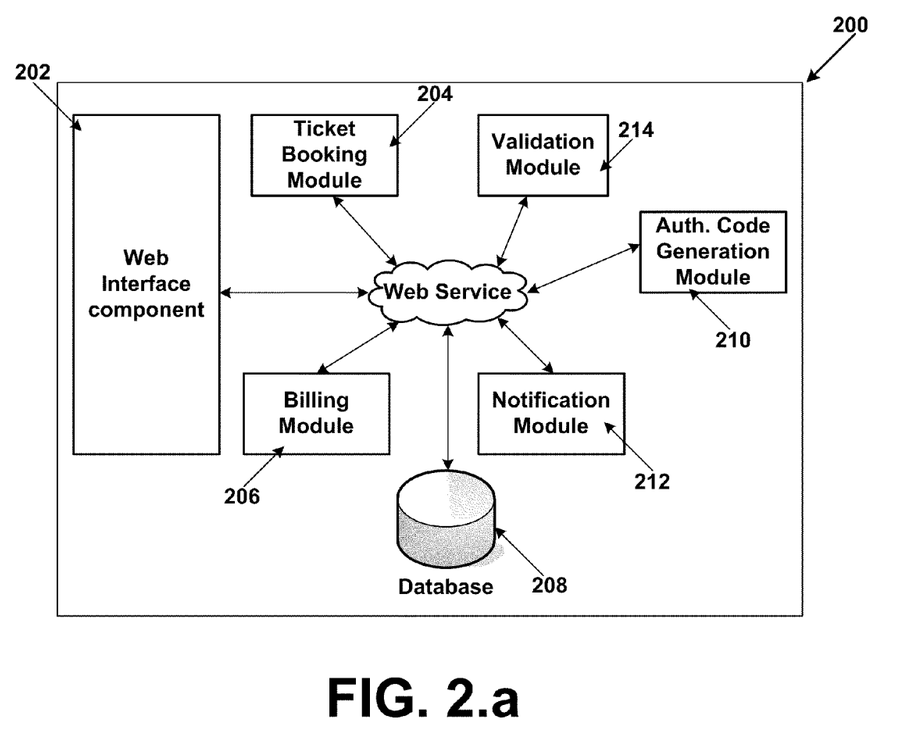

As shown in FIG. 1.c.1, viewer can extend the streaming digital content of event from personal computer to Television via Video Adapter 230 (as shown in FIG. 2.b) of validator apparatus. The validator apparatus connected to Personal computer either via I/O Device Interface (i.e., USB port) or network interface and Television is connected to video adapter of validator apparatus. Similarly, as shown in FIG. 1.c.2, viewer can extend the streaming digital content of event from mobile devices like iPhone, BlackBerry, Windows Mobile to Television via Video Adapter 230 (as shown in FIG. 2.b). The validator apparatus connected to mobile device either via I/O Device Interface (i.e., USB port) or network interface and Television is connected to video adapter of validator apparatus.

Referring to FIG. 2.a, a block diagram of the entertainment system of theater/auditorium of the present invention 200, hereinafter referred to as entertainment system 200, is illustrated. The system 200 is composed of separated components: the web interface component 202, Ticket Booking Module 204, Billing Module 206, Database 208, Authentication Code Generation Module 210, Notification Module 212 and Validation Module 214. Each component of the system is communicated through interoperable layer to leverage the Service Oriented Architecture benefits.

Referring to FIG. 2.b, a block diagram generally illustrating an exemplary apparatus architecture in which embodiments of the present invention 220, hereinafter referred to as validator apparatus 220, is illustrated. The present invention includes a general purpose communicating and validating apparatus in the form of a conventional device 220, provided with a processing unit 224, a memory 232, and a system bus 236. The system bus couples various system components including the system memory to processing unit 224. The validator apparatus further includes an Infrared Red (IR) scanner 222, Ticket Reader 226, Modem 228, Video Adapter 230, and I/O Device Interface 234. Each component of the validator communicates through system bus 236.

The IR scanner uses reflected IR light to detect viewers present in the room where the digital content of non-free event is being watched. The processing unit 224 plays an important role in the validator apparatus with memory 232. The memory 232 holds the necessary program routine to provide necessary firmware to complete the operation. For example, Ticket Reader 226 reads the event rating, number of tickets of adults and children, theater/auditorium information and 6-digit hexadecimal code from the ticket and then the collected information is being validated using processing unit by program routine in the memory. The processing unit utilizes the program routine in memory 232 to communicate to the entertainment system 200 of theater/auditorium to send the authentication code via modem 228. A modem 228 is used to modulate an analog carrier signal to encode digital information, and also demodulate such a carrier signal to decode the transmitted information. The goal is to produce a signal that can be transmitted easily and decoded to reproduce the original digital data. The video adapter 230 is closely connected to an interactive display device like Television, Computer Monitor or external monitor. An I/O device interface 234 of the validator apparatus 220 is an external device interface standard for communication between a validator apparatus and external device (i.e., mobile device, computer in according with present invention) over an inexpensive cable using bi-serial transmission. For example, I/O device interface is used to connect to the mobile devices like iPhone and the digital output of an iPhone can view through TV by connecting TV via video adapter of the validator.

Figure 3:
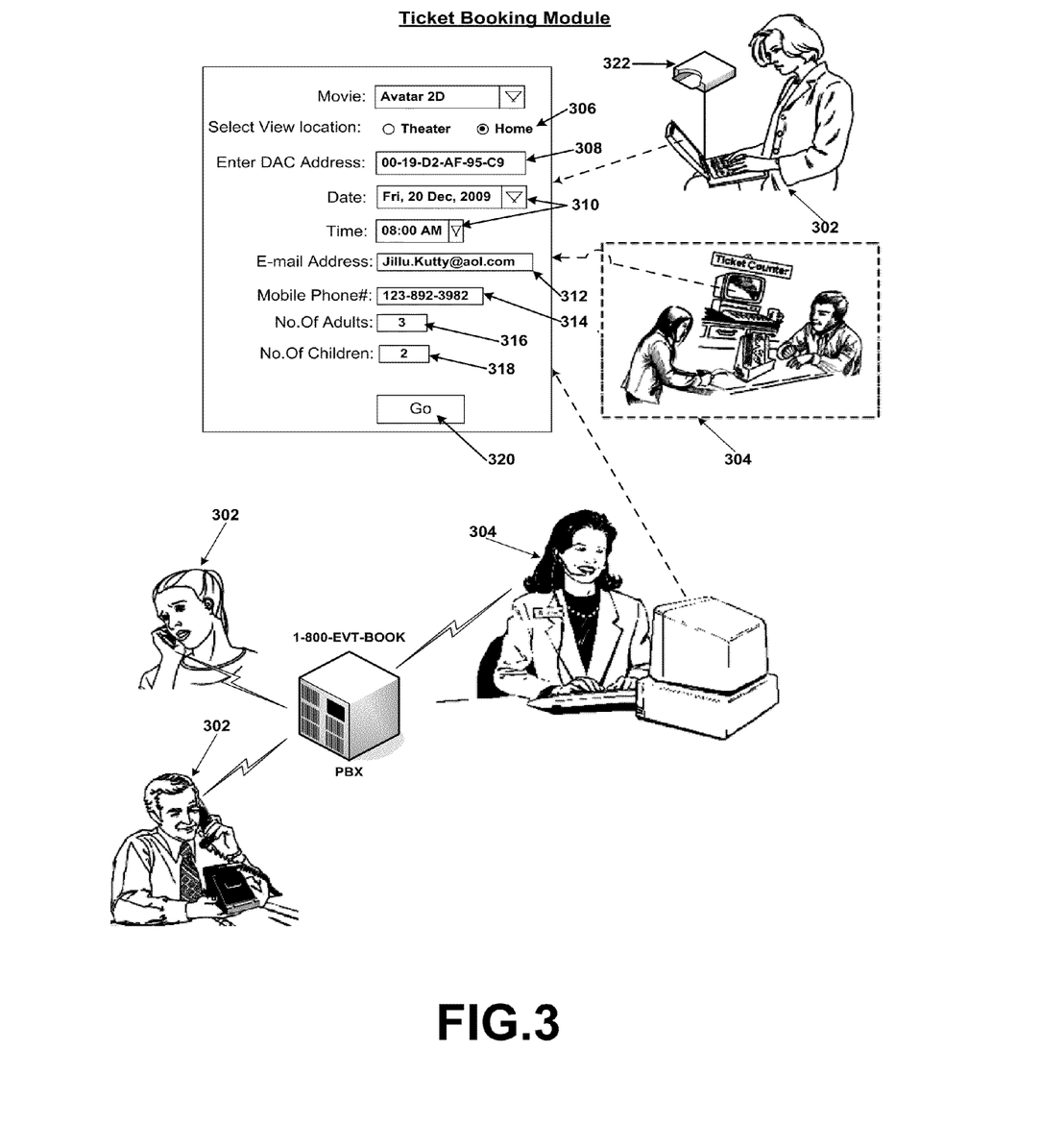
FIG. 3 is illustrating a web interface component of booking module in accordance with an event booking system (i.e., entertainment system) of theater/auditorium of present invention.

As shown in FIG. 3, the present invention provides the web interface component where viewer books the ticket. The web interface component provides a facility to select movie name 306, view location 308, date and time 310 as preferred by the viewer. The present invention provided three ways by which viewer can book tickets for the event. First, the viewer directly books using the web interface from home, secondly if they know their validator apparatus Device Access Control (DAC) address then they can book the tickets at ticket counter, thirdly viewers can also book the tickets by calling to toll-free number (e.g., 1-800-EVT-BOOK) where customer service representative of the organization (i.e, theater/auditorium) interact with viewer to provide information in response to inquiries about event and booking the tickets.

Figure 6:
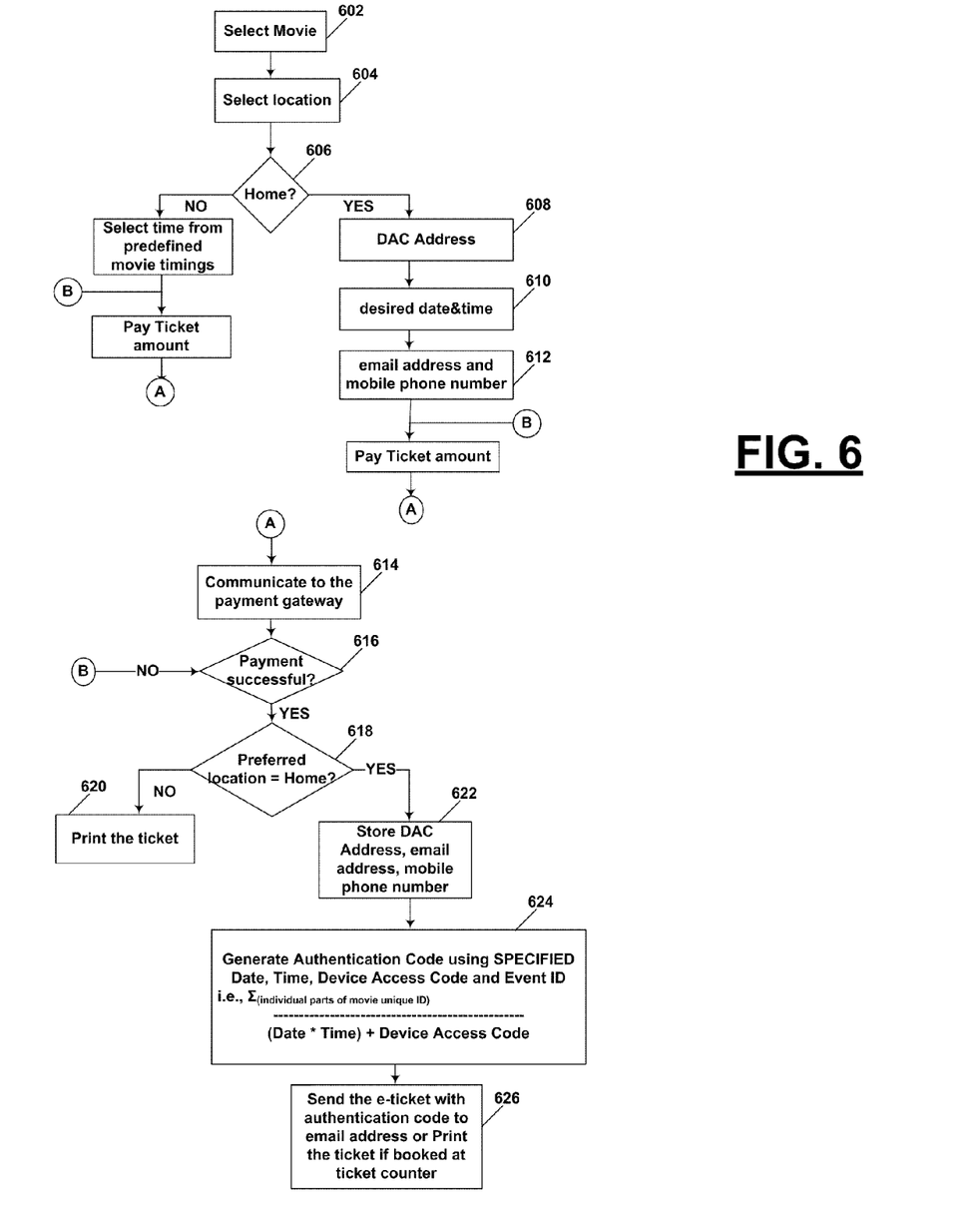
FIG. 6 is a flow chart illustrating a method for ticket booking and generating the authentication code in accordance with an embodiment of the invention.

If viewer, books ticket by directly accessing the web interface component 302, he/she selects the movie and their desired location to watch the movie. If viewer selects theater as their desired location to watch, system performs normal operation as today's ticket booking system as shown in FIG. 6. If viewer selects home as their desired location to watch, the present invention pre-populates the Device Access Control (DAC) address in the corresponding text box 308 when the computer accessing the web interface is connected to the validator apparatus 322 as shown in FIG. 3. Viewer can select any date and time 310 (e.g., anytime in 24 hours instead of predefined timings). Thus the present invention increases the revenue and it helps the film producers as well as the distributors who invest a huge sum of money for the making of each film. The web interface component also provides the fields to enter their email address 312 and phone number 314 where system sends a reminder notification to viewer. After the viewer enters the necessary details he/she can purchase the tickets by pressing 'Go' button 320.

When viewers call toll-free number a customer service representative 304 enters the necessary information in web interface component by asking the information from viewer 302. The information includes event (i.e., movie) name, location to watch the event 306, Device Access Control (DAC) address of viewer's validator device 308, convenient date and time to watch 310, email address 312, phone number 314 and number of tickets for adults 316 and children 318 separately. If the movie is R rated then system recommend them to not include the children to the viewers list. The same details are collected when the viewer 302 books ticket at the ticket counter 304.

Figure 4:
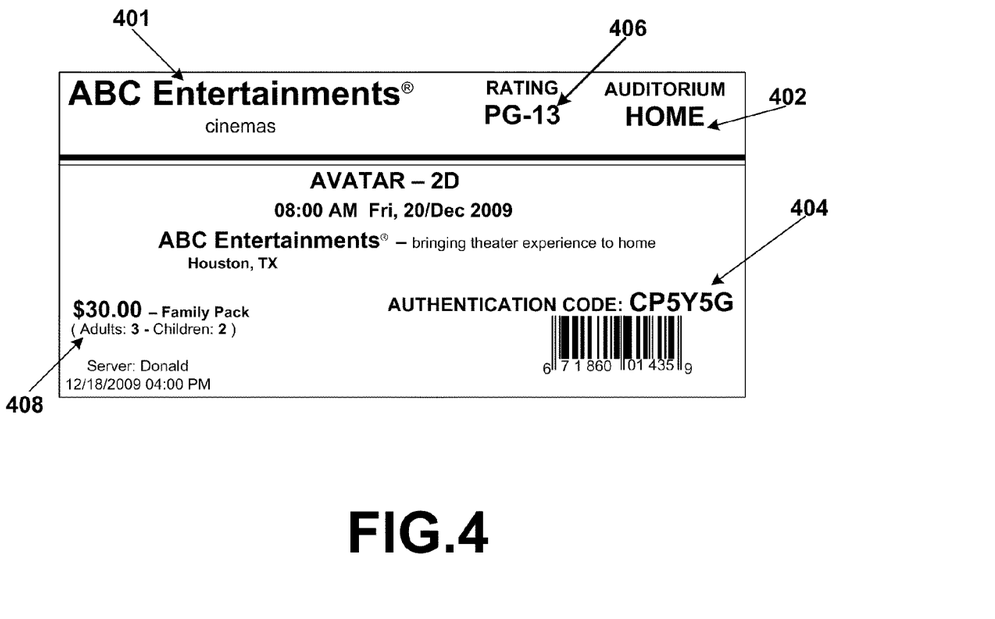
FIG. 4 is illustrating an event ticket with authentication code generated by the present invention.

Once viewer information are collected the present invention communicates with the payment gateway for further billing process as shown 614 of FIG. 6 If it is successful then system stores the entered data of viewers to database and generates the authentication code as shown in 624 of FIG. 6 and send the electronic ticket (as shown in FIG. 1.d.1) to their email address 312. If they book the ticket at the counter then counter sales executive provides the printed ticket (as shown in FIG. 4) to the viewer 302. FIG. 4 illustrates the ticket, which is generated by the present invention that has view location 402, authentication code 404, and event rating 406 and number of adults and number of children 408.

In operation, as shown in FIG. 3, the viewer buys ticket(s) either by going online or at ticket counter or by calling to the toll-free number (e.g., 1-800-EVT-BOOK). When viewer buys ticket(s) through online, the present invention provides a web interface component to gather the information from viewer which includes event (i.e., movie) name, location to watch the event 306, Device Access Control (DAC) address of viewer's validator device 308, convenient date and time to watch 310, email address 312, phone number 314 and number of tickets for adults 316 and children 318 separately. A viewer 302 chooses their desired location either in Theater/Auditorium or Home 302 to watch the event. If viewer chooses Home 302 as their desired location, the web interface component of present invention automatically populates their Device Access Code (DAC) address of validator apparatus which is closely connected to their computer and viewer chooses their desired date and timings (e.g., anytime in 24 hours instead of predefined timings) to watch the event like movie/non-free stage entertainment. If viewer is not connected to the validator while booking the tickets or book the tickets at the counter or by calling to the toll-free number to book the tickets then viewer provides their Device Access Control (DAC) address. After viewer enters the necessary information and places an order to buy the ticket, then the entertainment system of theater/auditorium of the present invention stores the information of viewer and corresponding Event ID in the database. Generally, all event names are stored in the database in the form of UUID (Universally Unique Id). The intent of UUIDs is to enable the present invention to uniquely identify the event information with central coordination. So, each and every event name is stored with its corresponding 128 bit number. Once this information is stored in the database the present invention then generates an authentication code based on viewer's Device Access Control (DAC) address, SPECIFIED date, and time provides a ticket with authentication code as shown in 624 of FIG. 6.

In some scenario, viewer calls to the customer service to book a ticket. Viewer calls to the toll-free number (e.g., 1-800-EVT-BOOK) to reach the customer service representative 304 of event organizer. The customer service representative 304 of the event organizer gathers event (i.e., motion picture show or non-free stage entertainment) name, location to watch the event, Device Access Control (DAC) address of viewer's validator device, convenient date and time to watch, email address, phone number and number of tickets from the viewer 302. The customer service representative 304 books the ticket on behalf of viewer and entertainment system of theater/auditorium of the present invention sends an e-ticket (as shown in FIG. 1.d.1) with authentication code to viewer's email address 312 as shown in FIG. 1.d.1.

The present invention sends a reminder notification to the viewer's cell phone (i.e., SMS Text message) and email address (e-mail message) before the event (i.e., movie/non-free stage entertainment) starts as shown in FIG. 1.d.2.

Figure 5:
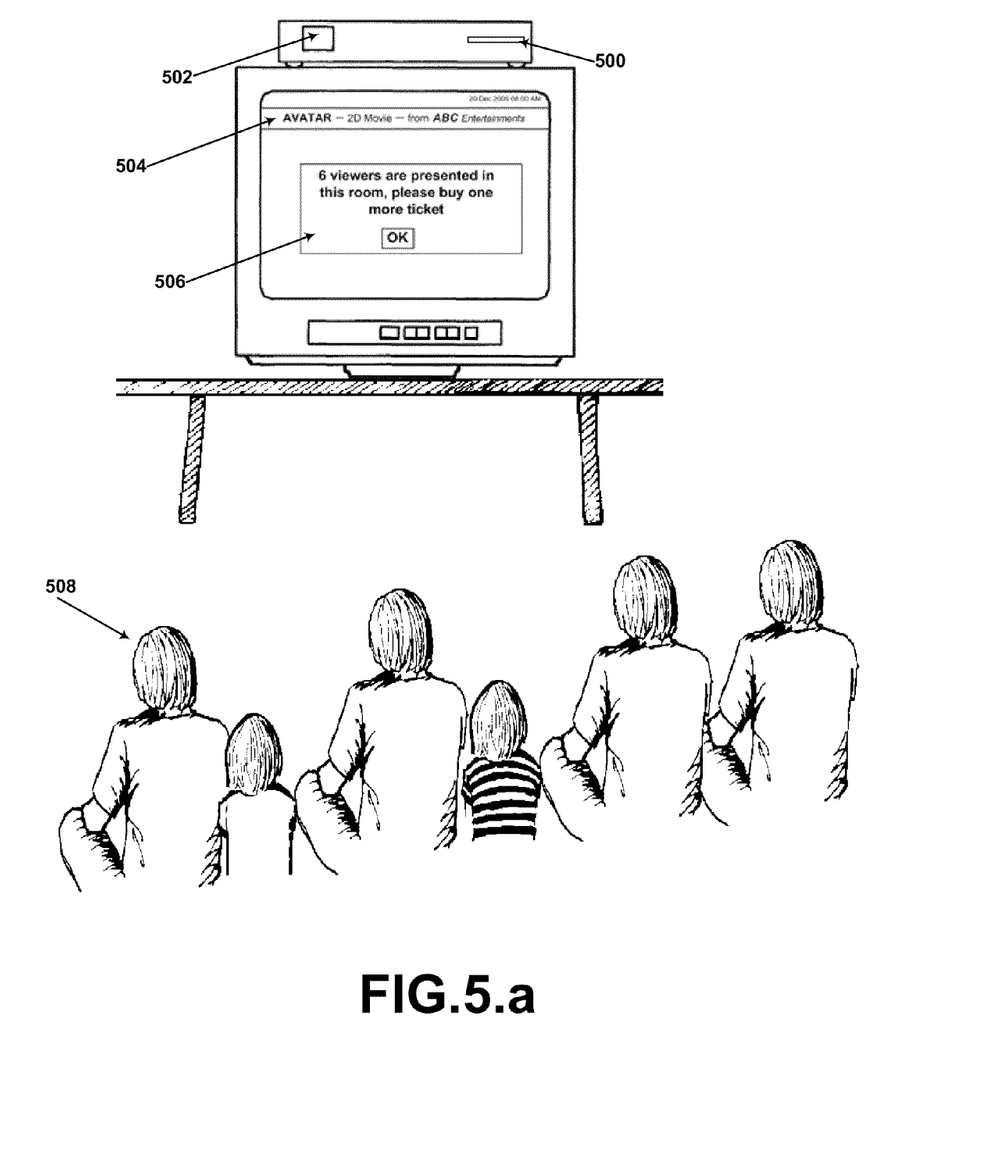
Figure 7:
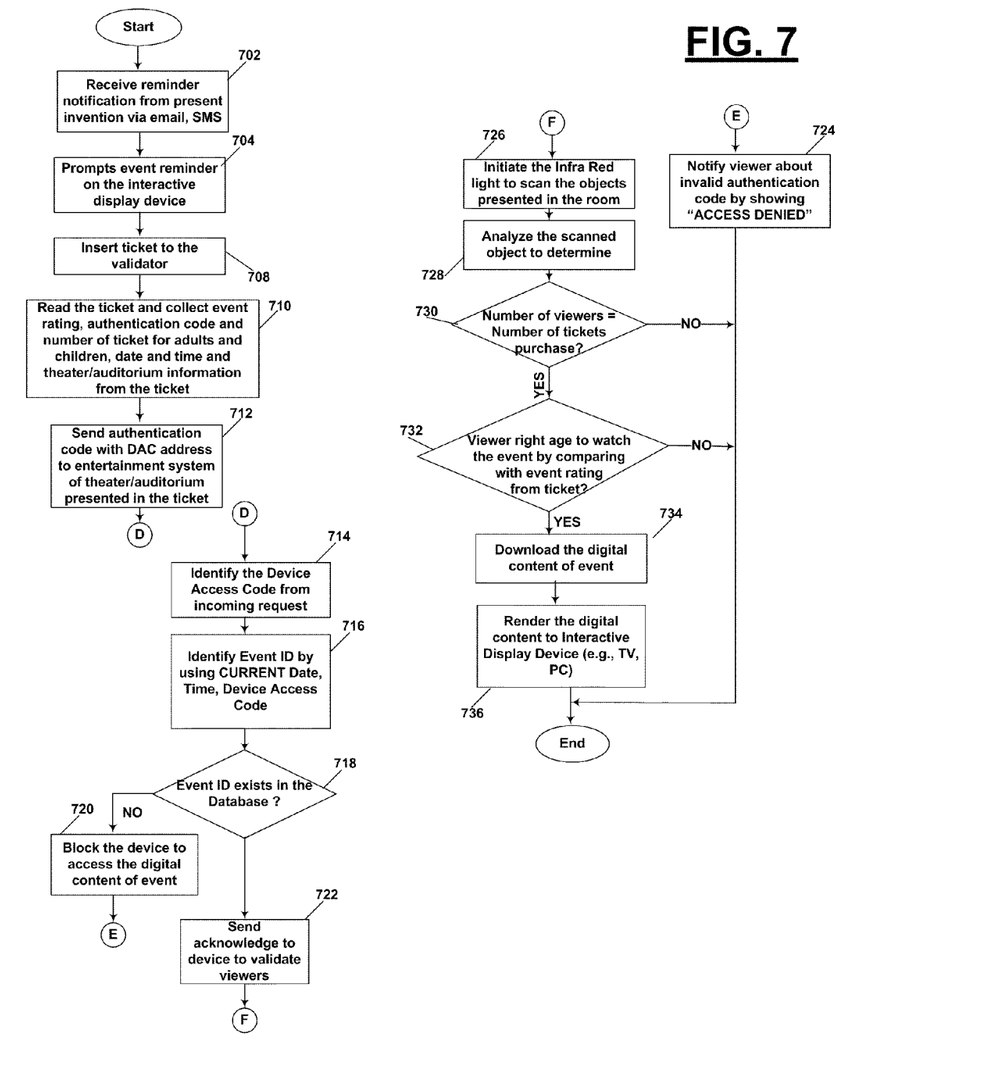
FIG. 7 is a flow chart illustrating a method for validating the authentication code and authorizing the viewers while event is taking place in accordance with an embodiment of the invention.

In embodiment as shown in FIG. 1.a, the present invention works with Television and validator apparatus is closely connected to the Television. When viewer is watching other television programs, the validator device automatically prompts a reminder to the viewer when their booking time is near as shown in 504 of FIG. 5.a. Viewer inserts the ticket to the validator apparatus to initiate the validation request. The validator apparatus reads the information (like 6-digit hexadecimal code, theatre/auditorium, rating of the digital content, date and time and theater/auditorium information) from ticket and then sends a request to the corresponding entertainment system of theatre/auditorium presented in the ticket with Device Access Code (DAC) address, CURRENT date, time (only hour without minutes) and the authentication code (from ticket). The entertainment system of theater/auditorium of the present invention determines the Event ID (i.e., UUID) based on the incoming request information (i.e., Device Access Code (DAC) address, CURRENT date, time (only hour without minutes) and the authentication code) 714. As shown in 718 of FIG. 7, If entertainment system of theater/auditorium of the present invention is not able to find the Event ID based on the incoming request from DAC address, CURRENT date, time (only hour without minutes) and the authentication code then the entertainment system of theater/auditorium of the present invention blocks the request from specified validator apparatus 720 and sends the notification to the validator apparatus that ticket is invalid and validator apparatus displays the error message as similar as "Access Denied—Please check Authentication code or if the selected event is for current date and time". If system is able to find the Event ID 722, the system sends acknowledgement to the validator apparatus with number of ticket (including number of adults, and number of children) to further validate the viewers watching the event. The processing unit 224 of validator apparatus receives the request through modem 228 and initiates the IR scanner 222 to scan viewers present in the room/hall where the digital content of non-free event is being watched. Then it analyzes the scanned objects from IR scanner by comparing the number of adults and children with the count of tickets purchased for adults and children individually. As shown in 730, if there is any mismatch between ticket count and viewers' count then the validator apparatus prompts the notification to viewer displaying as equivalent as "Exceeded Viewer's count, please check the tickets and buy ticket if it is necessary" as shown in FIG. 5.a.

The Processing unit 224 is capable of identifying viewers' age from scanned IR—x-ray images. Using these results processing unit 224 validates whether the viewer is in appropriate age to watch the rated content. For example, if the presented event rating is 'R' then validator prompts, to the viewer as "Access Denied" 510 if the viewers are children 512 as shown in FIG. 5.b. The validator identifies the event rating from the ticket when it reads the ticket using ticket reader. If validation 732 is successful then the validator apparatus downloads the digital content of non-free event from theater/auditorium entertainment system 734 and streams to viewer's interactive display device like Television or Computer or Mobile devices. The digital content of non-free event includes copyrights from the event distributor, so that viewer cannot save the digital content while viewing the event through their television. The validator also blocks the downloading or recording of the digital content using any type of Digital Recording electronic devices. Additionally, if viewer starts to watch the digital content of non-free event using a specific authentication code, they cannot watch the event again with same authentication code; because once the SPECIFIED date and time expires the authentication code expires automatically.

In another embodiment as shown in FIG. 1.b, the present invention works with personal computer and validator apparatus is closely connected to personal computer. Viewer receives a notification message (as shown in FIG. 1.d.2) to the provided email address 302; by connecting to the validator apparatus, the ticket reader validates the identity from e-ticket and then the digital content of event like movie or non-free stage entertainment starts streaming into their default media player once the request is validated. Similarly, iPhone, blackberry, and windows mobile devices can connect to the validator device via USB port and once the e-ticket is validated then digital content of the event start streaming to either external monitor like TV or other media player in mobile device. Thus, viewers watch the digital content using media player like Windows Media Player, Real Player, DivX, etc from their personal computer, mobile device like iPhone, Windows Mobile, BlackBerry etc.

In another embodiment of the present invention as shown in FIG. 1.c.1, the present invention allows viewer to extend the streaming digital content of event from their personal computer to external monitor or Television using the validator device video adapter.

Similarly, in another embodiment of the present invention as shown in FIG. 1.c.2, the present invention allows viewer to extend the streaming digital content of event from their mobile device like iPhone, BlackBerry, Windows Mobile to external monitor or Television using the validator device video adapter and Mobile device is connected to validator device via I/O device interface 234.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application. Although the present invention has been described with reference to particular embodiments, it will be apparent to those skilled in the art that variations and modifications can be substituted without departing from the principles and spirit of the invention.

I claim:

1. An apparatus to authorize an authentication code on a ticket for viewing digital content of non-free event from theater/auditorium, said apparatus to validate a count of viewers watching the non-free event based on count of tickets purchased, said apparatus to download and stream the digital content of non-free event from a theater/auditorium to an interactive display electronic device in a room/hall, said apparatus comprising:
- an infrared scanner to detect viewers present in the room using reflected infrared light;
- a modem to modulate an analog carrier signal to encode digital information, and also demodulate such a carrier signal to decode transmitted information;
- a memory to hold a program routine to provide necessary firmware to complete an operation of authorizing the authentication code;
- a processing unit to utilize the program routine in said memory to communicate with entertainment system of an organization, to send an authentication code via said modem, where organization is theater/auditorium;
- a ticket reader to read an event rating, number of tickets of adults and children, 6-digit hexadecimal code from the ticket;
- a video adapter to connect to an interactive display device or external monitor;
- an I/O device interface to provide communication between said apparatus and external devices over an inexpensive cable using bi-serial transmission; and
- a system bus is to provide the communication between each component of said apparatus.

2. The apparatus according to claim 1, wherein an interactive display electronic device is a television.

3. The apparatus according to claim 1, wherein an interactive display electronic device is a computer or laptop.

4. The apparatus according to claim 1, wherein the external device is a mobile device.

5. The apparatus according to claim 1, where the external device is a computer or laptop.

6. The apparatus according to claim 1, wherein a room/hall is a building, part of a building with said apparatus.

7. The apparatus according to claim 1, wherein said digital content of non-free event comprises at least one of:
content,
audio content,
video content,
movie content,
a broadcast,
a digital broadband broadcast,
a video,
an audio,
a movie,
a streaming audio,
a streaming video,
streaming content,
a live event,
a sporting event,
a news event,
an entertainment event,
a concert,
a show,
a performance,
a movie,
an awards show,
an online event,
a game,
a video game,
a business to business seminar,
a seminar,
an organizational meeting,
a conference,
a video conference,
a multi-tiered tournament,
an interview.

* * * * *